United States Patent [19]

Tanaka et al.

[11] Patent Number: 5,184,149
[45] Date of Patent: Feb. 2, 1993

[54] COMBINATION OF MAGNETIC CARD AND PRINTING APPARATUS THEREFOR

[75] Inventors: Tsugutoshi Tanaka; Soji Ishiwata, both of Kanagawa, Japan

[73] Assignee: Nippon Aleph Corporation, Kanagawa, Japan

[21] Appl. No.: 777,128

[22] Filed: Oct. 16, 1991

[30] Foreign Application Priority Data

Aug. 23, 1991 [JP] Japan .................................. 3-74285

[51] Int. Cl.$^5$ .......................... G11B 9/00; G01D 9/00
[52] U.S. Cl. ............................... 346/74.2; 346/135.1
[58] Field of Search ............... 346/74.2–74.6, 346/135.1, 162, 163

[56] References Cited

U.S. PATENT DOCUMENTS

| | | | |
|---|---|---|---|
| 4,241,156 | 12/1980 | Haas et al. | 346/135.1 |
| 4,346,156 | 8/1982 | Faucz | 346/74.2 X |
| 4,482,901 | 11/1984 | Kudelski et al. | 346/135.1 |
| 4,599,658 | 7/1986 | Saitoh et al. | 346/74.2 X |
| 5,093,174 | 3/1992 | Suzuki et al. | 346/135.1 X |

Primary Examiner—George H. Miller, Jr.
Attorney, Agent, or Firm—Nixon & Vanderhye

[57] ABSTRACT

In a combination of a magnetic card and a printing apparatus therefor, the magnetic card comprises a substrate made of a non-magnetic material, and a printing surface on at least a part of one side of the substrate. The printing surface has a coloring layer, a conductive layer and a protective layer. The coloring layer is located on the one side of the substrate, and the conductive layer is located between the coloring layer and the protective layer. The magnetic card further includes a magnetic recording layer formed on one of the one and other sides of the substrate. Magnetic information is magnetic-recorded on the magnetic recording layer. The printer comprises an electrosensitive unit for discharge-breaking down the protective layer and the conductive layer of the printing surface, into a character pattern corresponding to the magnetic information magnetic-recorded on the magnetic recording layer, to expose at least a part of the coloring layer in at least an area of the protective layer and the conductive layer which is discharge-broken down, thereby indicating the character pattern.

25 Claims, 8 Drawing Sheets

COMBINATION OF MAGNETIC CARD AND PRINTING APPARATUS THEREFOR

BACKGROUND OF THE INVENTION

The present invention relates to a combination of a magnetic card and a printing apparatus for printing characters or the like representing magnetic information, on a surface of the magnetic card, the magnetic card being, for example, a prepaid card in which a used date, a used amount of money, the balance or remainder and the like are recorded as the magnetic information.

A so-called prepaid card or the like has conventionally been known in which punching bores are formed through the magnetic card at a location adjacent to beforehand printed numbers or numerals indicating the remaining amount of money or the like, in accordance with the used condition of the magnetic card, to indicate the balance or the like of the magnetic card. This, however, can merely grasp a summary of the balance and the like, but the accurate remaining amount of money and the like cannot be known.

For the reason described above, it is difficult to know time to purchase or buy a new magnetic card, and it is known to be unable to purchase goods or the like because the balance is small, for the first time when the magnetic card is used.

A system is also known in which magnetic information such as the balance and the like recorded on the magnetic card is printed on the surface of the magnetic card.

This system is arranged as follows. That is, magnetic information such as a used date, a used amount of money, the balance or remainder and the like recorded on the magnetic card, for example, on a magnetic recording surface of a prepaid card having a heat sensitive recording layer is read by a magnetic head. The magnetic information is transduced into a character pattern. A heat sensitive head is driven and controlled on the basis of the character pattern, to color heat-sensitive recording layer sections on the surface of the magnetic card, thereby indicating or displaying the character pattern on the surface of the magnetic card.

Thus, a user of the magnetic card views the character pattern printed on the surface of the magnetic card so that it is possible to easily obtain information such as a used date, a used amount of money, the balance or remainder and the like which are magnetic-recorded on the magnetic card.

In the printing system of the magnetic card, however, since the printing system is a heat sensitive system, the following problems and the like arise. That is, the printing speed is low. Further, since, on the side of the magnetic card, the heat sensitive recording layer is arranged on the surface of the magnetic card, coloring of the heat sensitive recording layer, and fading or discoloring of the printing per se are relatively fast.

Further, the following problems also arise. That is, since, on the side of the printing apparatus, the service life of the heat sensitive head or the like is relatively short, it is necessary to frequently replace parts or components. Thus, the maintenance cost relatively increases.

SUMMARY OF THE INVENTION

It is an object of the invention to provide a combination of a magnetic card and a printing apparatus therefor, in which printing speed is fast, printing quality is high, and maintenance cost is not so much high.

According to the invention, there is provided a combination of a magnetic card and a printing apparatus therefor, the magnetic card comprising a substrate made of a non-magnetic material, a printing surface on at least a part of one side of the substrate, the printing surface having a coloring layer, a conductive layer and a protective layer, the coloring layer being located on the one side of the substrate, and the conductive layer being located between the coloring layer and the protective layer, the magnetic card further including a magnetic recording layer formed on one of the one and other sides of the substrate, magnetic information being magnetic-recorded on the magnetic recording later; and the printer comprising electrosensitive means for discharging-breaking down the protective layer and the conductive layer of the printing surface, into a character pattern corresponding to the magnetic information magnetic-recorded on the magnetic recording layer, to expose at least a part of the coloring layer in at least an area of the protective layer and the conductive layer which is discharge-broken down, thereby indicating the character pattern.

With the above arrangement of the invention, the printing surface on the magnetic card is discharge-broken down into a shape or configuration of the character pattern corresponding to the magnetic information of the magnetic card, whereby the character pattern is formed on the printing surface on the magnetic card. Thus, it is possible to raise printing speed as compared with the case of the conventional heat sensitive system.

Preferably, a transporting path is defined along which the magnetic card is transported. The electrosensitive means of the printing apparatus includes a discharge head for effecting the discharge breakdown. The discharge head includes a plurality of printing pins arranged along the transporting path.

With the above arrangement of the invention, if the printing pins of the discharge head is made thin, it is possible to raise resolution of the printing. Furthermore, since the discharge head per se is long in service life as compared with the heat sensitive head, a few number of replacements of the discharge head is sufficient, making it possible to reduce the maintenance cost.

Preferably, a transporting path is defined along which the magnetic card is transported. The electrosensitive means is arranged by the transporting path. The printing apparatus further includes roller means arranged at a trailing edge or end of the transporting path. The roller means includes an earth roller assembly. The magnetic card is transported along the transporting path while being in contact with the earth roller assembly.

With the above arrangement of the invention, when the magnetic card is transported along the transporting path, a circumferential surface of the earth roller assembly is in contact with the conductive layer through the protective layer which is thin.

Preferably, the earth roller assembly has a circumferential surface thereof which is knurled.

With the above arrangement of the invention, a forward end of the knurling is cut into or bitten into the printing surface on the magnetic card, so that the forward end of the knurling is in direct contact with the conductive layer through the protective layer within the printing surface. Thus, electric potential of the printing surface on the magnetic card, which is opposed to the discharge head, is brought to earth electric potential, so that a high potential difference occurs between the discharge head and the printing surface on the magnetic card. In this manner, the discharge breakdown is effected efficiently.

Moreover, since the displayed color is decided depending upon the color of the coloring layer, display of optional color is possible, making it possible to produce display easier to view.

Preferably, the earth roller assembly includes at least one earth roller having a circumferential surface to be urged against the magnetic card. The circumferential surface of the earth roller is irregular in an axial direction of the earth roller assembly.

With the above arrangement of the invention, the irregular configuration of the circumferential surface of the earth roller is such that, when the circumferential surface of the earth roller is abutted against the printing surface on the magnetic card at which printing due to the discharge breakdown is to be effected, a difference between a crest and a valley of the knurling is small, and the forward end of the knurling is not sharp or pointed. Accordingly, a contact area with respect to the printing surface on the magnetic card increases. Thus, even in the case where the substrate forming the magnetic card is made of a relatively hard material, a relatively large contact area can be secured with respect to the printing surface on the magnetic card, so that the contact resistance with respect to the conductive layer of the printing surface on the magnetic card can be restrained relatively low. Accordingly, there is no case where discharge breakdown occurs between the earth roller and the magnetic card. It can be secured that discharge breakdown occurs between the discharge electrodes or pins of the printing head and the predetermined area on the conductive layer of the magnetic card.

Preferably, the printing apparatus comprises cleaning plate means abutted against a circumferential surface of the earth roller assembly.

With the above arrangement of the invention, rotation of the earth roller assembly causes the circumferential surface of the earth roller assembly to be scratched off by the cleaning plate means. Thus, even in the case where foreign matters such as insulator and the like are adhered to the circumferential surface of the earth roller assembly, it is possible to remove the foreign matters by the cleaning plate means. Accordingly, there is no case where adhering of the foreign matters to the circumferential surface of the earth roller assembly increases the contact resistance between the earth roller assembly and the conductive layer of the magnetic card.

Preferably, the earth roller assembly has a circumferential surface thereof which is plated by one of platinum group elements including rhodium, ruthenium, palladium and the like.

With the above arrangement of the invention, surface hardness and corrosion resistance can be improved as compared with a surface which is plated by nickel. Accordingly, there is no case where the circumferential surface of the earth roller assembly is damaged or marred, is oxidized or the like so that the contact resistance between the earth roller assembly and the conductive layer of the magnetic card increases. Thus, it is further ensured that the electric potential of the conductive layer of the magnetic card, which is opposed to the discharge electrodes or pins of the printing head is brought to the earth potential so that a high potential difference occurs between the conductive layer and the discharge head. Accordingly, the discharge breakdown is effected efficiently.

Preferably, the printing apparatus comprises a rotary shaft, the earth roller assembly including at least one earth roller which is mounted on the rotary shaft for rotation about an axis of the rotary shaft. The printing apparatus further includes a transporting roller made of an elastic material. The transporting roller is mounted on the rotary shaft in spaced relation to the earth roller. Moving means is provided for moving the rotary shaft toward and away from the one side of the magnetic card. When the magnetic card is transported along the transporting path, a circumferential surface of the earth roller mounted on the rotary shaft is moved away from the one side of the magnetic card so that only the transporting roller is urged against the one side of the magnetic card to transport the magnetic card along the transporting path, while, when printing is made on the magnetic card, the rotary shaft is moved toward the one side of the magnetic card so that both the earth roller and the transporting roller are abutted against the one side of the magnetic card.

With the above arrangement of the invention, when, for example, the magnetic information is read and written with respect to the magnetic card, the magnetic card is transported at a constant speed. Further, since the rotary shaft for the earth roller is slightly spaced away from the printing surface on the magnetic card, only the transporting roller mounted on the rotary shaft is urged against the printing surface on the magnetic card. The earth roller is not in contact with the printing surface on the magnetic card, or is in light contact with the magnetic card. Thus, there is no case where the earth roller exerts a relatively strong urging force to the magnetic card. Accordingly, the magnetic card is transported at a constant speed without the transporting speed of the magnetic card changing abruptly, so that reading and writing of the magnetic information is accurately effected with respect to the magnetic card.

Further, when printing is effected with respect to the printing surface on the magnetic card due to the discharge breakdown, the rotary shaft of the earth roller is moved toward the printing surface on the magnetic card, so that the earth roller is also urged against the surface of the magnetic card at a predetermined urging force. Thus, it is ensured that the circumferential surface of the earth roller is in contact with the conductive layer of the magnetic card on the basis of the urging force, so that the conductive layer of the magnetic card is held or retained at the earth potential. Accordingly, printing due to the discharge breakdown is effected similarly to the aforesaid invention.

Preferably, the roller means further includes an opposed roller assembly arranged in opposed relation to the earth roller assembly. The transporting path extends between the earth roller assembly and the opposed roller assembly. The opposed roller assembly includes at least one hard roller having an outer circumferential surface formed therein with an annular groove and a rubber ring fitted in the annular groove.

With the above arrangement of the invention, in the case where an urging force greater than a constant or predetermined value is applied to the opposed roller assembly from the earth roller assembly, the surface of the earth roller assembly is urged against a circumferential surface of the hard roller of the opposed roller assembly so that the hard roller is prevented from being moved radially more than that. Accordingly, the rubber ring on the hard roller is not deformed more than the necessity. Thus, unevenness or irregularity does not occur in the transporting speed of the magnetic card.

Preferably, the earth roller assembly includes a rubber ring adapted to be urged against the ribber ring fitted in the annular groove in the hard roller.

With the above arrangement of the invention, it is possible to further restrain deformation of the rubber ring in the annular groove in the hard roller.

DETAILED DESCRIPTION OF THE DRAWINGS

DESCRIPTION OF THE EMBODIMENTS

Various embodiments of the invention will be described below. It is to be noted that the description of parts and elements identical in function with those in the various embodiments will be omitted to avoid repetition.

Figure 1:
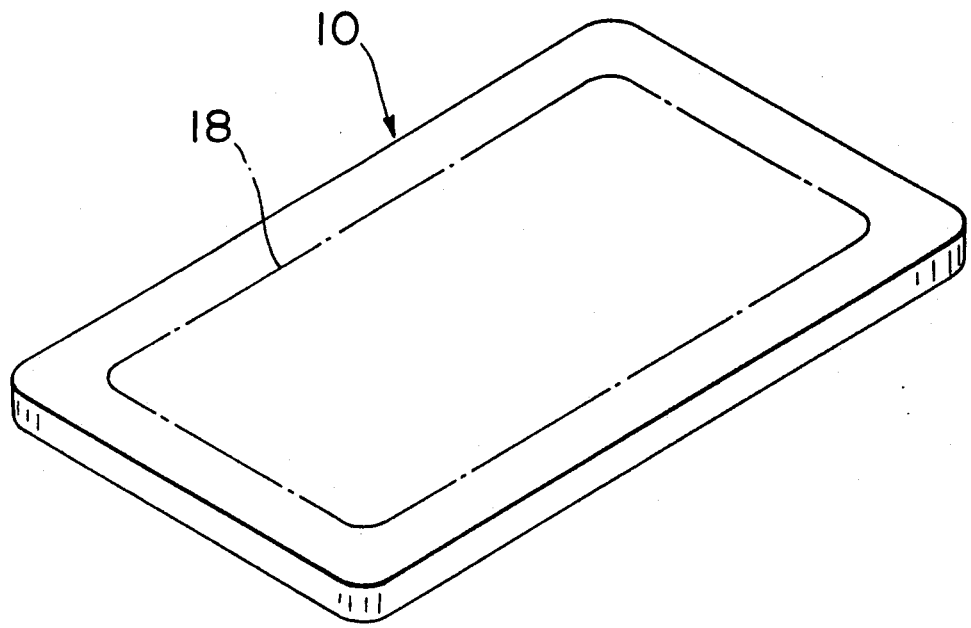
FIG. 1 is a perspective view of a magnetic card.
Figure 2:
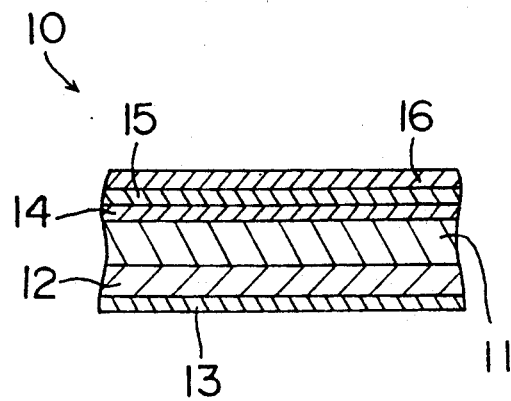
FIG. 2 is a fragmentary schematic enlarged cross-sectional view showing the magnetic card illustrated in FIG. 1.

Referring first to FIGS. 1 and 2, there is shown a magnetic card 10. The magnetic card 10 comprises a substrate 11 made of a non-magnetic material such as a plastic material and a paper. The plastic material is such as PET (polyethylene terephtahalate) or the like, for example. The substrate 11 has one side thereof on which a magnetic recording layer 12 and a protective layer 13 are formed with the magnetic recording layer 12 located between the one side of the substrate 10 and the protective layer 13. A coloring layer 14, a conductive layer 15 and a protective layer 16 cooperate with each other to form a printing area or surface 18 which extends over at least a part of the other side of the substrate 11, with the coloring layer 14 formed on the other side of the substrate 11 and with the conductive layer 15 located between the coloring layer 14 and the protective layer 16.

As is known well, the magnetic recording layer 12 is formed such that fine particulates of, for example, a magnetic material are applied to the one side of the substrate 11. Further, the conductive layer 15 is formed such that a metal such as aluminum or the like is vapor-deposited on a surface of the coloring layer 14.

Furthermore, each of the protective layers 13 and 16 is formed such that an insulator such as vinyl or the like is applied thinly to the surface of the magnetic recording layer 12 or the surface of the conductive layer 15. Moreover, letters or characters, figures and patterns, and the like, which indicate the contents, uses and the like of the magnetic card 10, can be printed on the surface of each of the protective layers 13 and 16.

Figure 3:
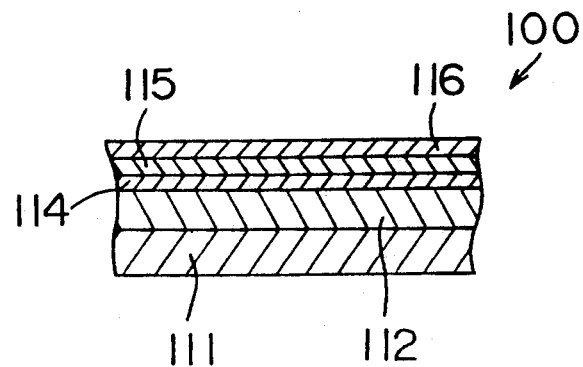
FIG. 3 is a view similar to FIG. 2, but showing a magnetic card different in construction from the magnetic card illustrated in FIGS. 1 and 2.

In connection with the above, in the magnetic card 10 constructed as described above, the magnetic recording layer 12 is formed on the one side of the substrate 11, while the coloring layer 14 and the conductive layer 15 are formed on the other side of the substrate 11. As shown in FIG. 3, however, a magnetic card 100 may comprise a substrate 111 having one side thereof on which a magnetic recording layer 112, a coloring layer 114, a conductive layer 115 and a protective layer 116, corresponding respectively to the magnetic recording layer 12, the coloring layer 14, the conductive layer 15 and the protective layer 16 of the magnetic card 10 illustrated in FIGS. 1 and 2, are formed. The magnetic recording layer 112 is formed on the one side of the substrate 11, and the coloring layer 114 is located between the magnetic recording layer 112 and the conductive layer 115, while the conductive layer 115 is located between the coloring layer 114 and the protective layer 116.

Figure 4:
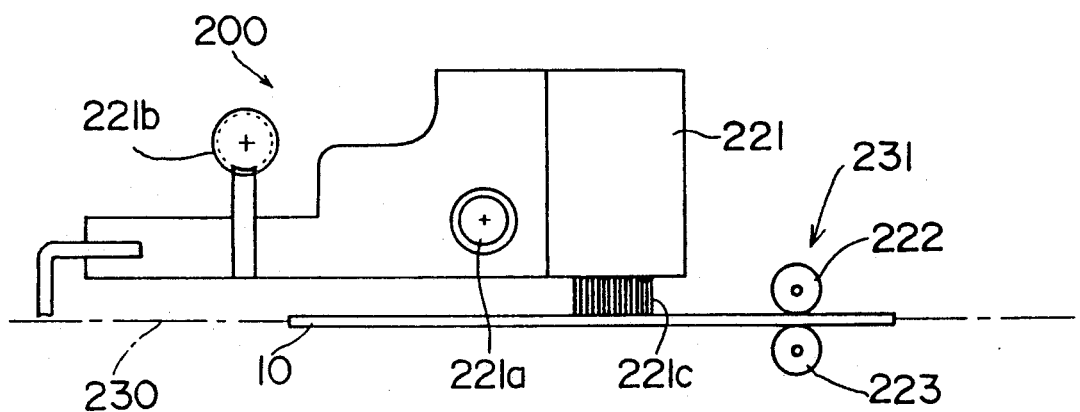
FIG. 4 is a schematic side elevational view showing a combination of the magnetic card illustrated in FIGS. 1 and 2 and a printing apparatus therefor, according to an embodiment of the invention.

FIG. 4 shows a printing apparatus 200 for effecting printing on a surface or one side of a magnetic card, for example, of one of the magnetic cards 10 and 100 illustrated respectively in FIGS. 1 and 2 and FIG. 3. Thus, a combination of the magnetic card 10 illustrated in FIGS. 1 and 2 and the printing apparatus 200, according to the invention, will be described below.

The printing apparatus 200 comprises an electrosensitive unit, such as a discharge head 221, for discharge-breaking down the protective layer 16 and the conductive layer 15 of the magnetic card 10, into a character pattern corresponding to magnetic information magnetic-recorded on the magnetic recording layer 12, to expose at least a part of the coloring layer 14 in at least an area of each of the protective layer 16 and the conductive layer 15, which is discharge-broken down, thereby indicating the character pattern.

A transporting path 230 is defined along which the magnetic card 10 is transported. The discharge head 221 is arranged by the transporting path 230. A roller unit 231 is arranged at a trailing end of the transporting path 230. The roller unit 231 includes an upper earth roller assembly 222. The magnetic card 10 is transported along the transporting path 230 while being in contact with the earth roller assembly 222.

The roller unit 231 further includes a lower drive roller assembly 223 which is arranged in opposed relation to the upper earth roller assembly 222. The transporting path 230 extends between the earth roller assembly 222 and the drive roller assembly 223. The earth roller assembly 222 includes a pair of earth rollers (not shown) arranged in spaced relation to each other in the axial direction of the earth roller assembly 222. Although not shown, the drive roller assembly 223 has a pair of spaced drive rollers (not shown) which are adapted to be in contact respectively with the pair of earth rollers. The drive rollers of the drive roller assembly 223 are driven by a card transporting motor (not shown) through an endless belt. On the other hand, the earth rollers of the earth roller assembly 222 are freely rotatable about the axial direction of the earth roller assembly 222.

The discharge head 221 is supported for sliding movement along a guide rail 221a which extends in a direction perpendicular to the drawing sheet. Rotational driving of a feed screw 221b, which extends in parallel relation to the guide rail 221a, causes the discharge head 221 to be reciprocatively moved in the direction perpendicular to the drawing sheet. Thus, the printing apparatus 200 is a so-called a serial printer type.

The combination of the magnetic card 10 and the printing apparatus 200 therefor, according to the embodiment of the invention, is constructed as described above. When the magnetic card 10 is inserted into a location between the earth roller assembly 222 and the drive roller assembly 223 from the right in FIG. 4, rotational driving of the drive roller assembly 223 causes the magnetic card 10 to be transported to the left in FIG. 4. When the printing surface 18 on the magnetic card 10 is brought to a location opposed to a plurality of printing electrodes or pins 221c of the discharge head 221, which are arranged along the transporting direction of the magnetic card 10, discharge voltage is applied from the outside to predetermined ones of the printing pins 221c of the discharge head 21.

On the other hand, the magnetic card 10 is in contact with the earth roller assembly 222, whereby the conductive layer 15 within the printing surface 18 on the magnetic card 10 is brought substantially to an earth potential. Accordingly, a high electric potential difference occurs between the printing pins 221c of the discharge head 221 and the conductive layer 15 of the magnetic card 10 within the printing surface 18. Electric discharge occurs between the printing pins 221c and the conductive layer 15 of the magnetic card 10 within the printing surface 18, which is opposed to the printing pins 221c. By the electric discharge, an area/areas within the conductive layer 15 of the magnetic card 10, which is/are opposed to the printing pins 221c, is/are broken down so that a bore or bores is/are formed in the area/areas due to the electric discharge. As a result, a part/parts of the coloring layer 14 located below the bore/bores is/are exposed. Accordingly, in the case where observation is made from the above, colored display is effected whose configuration corresponds to the bore/bores.

The magnetic card 10 is transported intermittently by the drive roller assembly 223 to the left in FIG. 4 at predetermined intervals. The discharge head 221 is scanned laterally with respect to the transporting direction of the magnetic card 10, by rotation of the feed screw 221b. Accordingly, the boring or punching described above due to the electric discharge breakdown is effected in the form of a dot matrix such that the bores are brought to a desirable display pattern, for example, to a character pattern such as a used date, a used amount of money, the balance or remainder and the like in accordance with the kind or type of the magnetic card 10.

In connection with the above, boring or punching is effected by control of application of the electric discharge voltage to the various printing pins 221c of the discharge head 221 in the following manner. That is, a magnetic card reader (not shown) or the like, for example, is used to read magnetic information recorded on the magnetic recording layer 12 of the magnetic card 10. A character pattern corresponding to the magnetic information is displayed. Further, when the magnetic card 10 is used, the magnetic information is recorded on the magnetic recording layer 12 of the magnetic card 10 and, simultaneously, a character pattern corresponding to the magnetic information is displayed.

Figure 5:
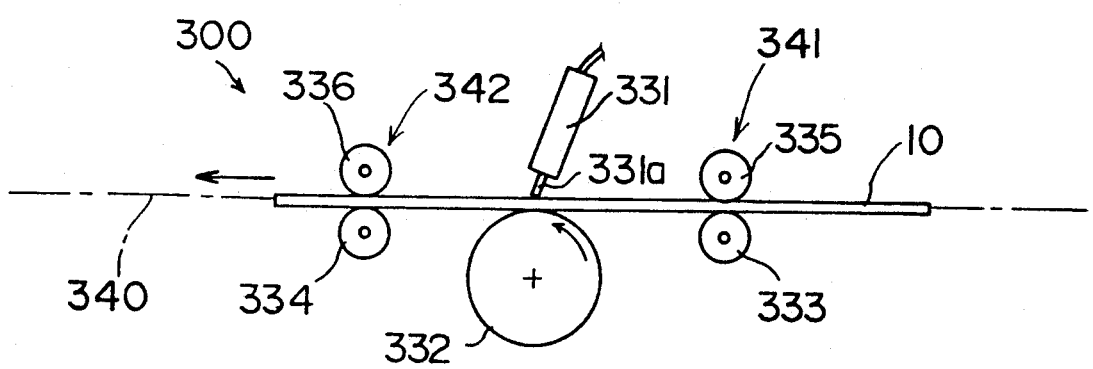
FIG. 5 is a schematic side elevational view showing a combination of the magnetic card illustrated in FIGS. 1 and 2 and a printing apparatus therefor different in construction from the printing apparatus illustrated in FIG. 4.

FIG. 5 shows a printing apparatus 300 of line printer type, not the printing apparatus 200 of the serial printer type illustrated in FIG. 4. Thus, a combination of the magnetic card 10 illustrated in FIGS. 1 and 2 and the printing apparatus 300 will be described below.

The printing apparatus 300 comprises a discharge head 331 which is fixedly arranged at a location above a transporting path 340 for the magnetic card 10. The discharge head 331 includes a plurality of printing electrodes or pins 331a which are arranged in a direction perpendicular to the transporting path 340, i.e., in a direction perpendicular to the drawing sheet, substantially over an entire width of the magnetic card 10. Further, a platen 332 is arranged below the transporting path 340 for the magnetic card 10, in opposed relation to the discharge head 331. A pair of roller assemblies 341 and 342 are arranged respectively in front of and in rear of the discharge head 331 and the platen 332. One of the pair of roller assemblies 341, on the upstream side, comprises an upper earth roller 335 and a lower pinch roller 333 arranged in opposed relation to the upper earth roller 335. The other roller assembly 342 on the downstream side comprises an upper earth roller 336 and a lower pinch roller 334 arranged in opposed relation to the upper earth roller 336.

In the case of the embodiment illustrated in FIG. 5, the magnetic card 10 is transported with the printing surface 18 thereof brought to an upper face. Similarly to the printing apparatus 200 illustrated in FIG. 4, the conductive layer 15 within the printing surface 18 is broken down due to electric discharge between the conductive layer 15 and the printing pins 331a of the discharge head 331 so that the coloring layer 14 is exposed. In this manner, a desirable character pattern or the like is displayed.

Figure 6:
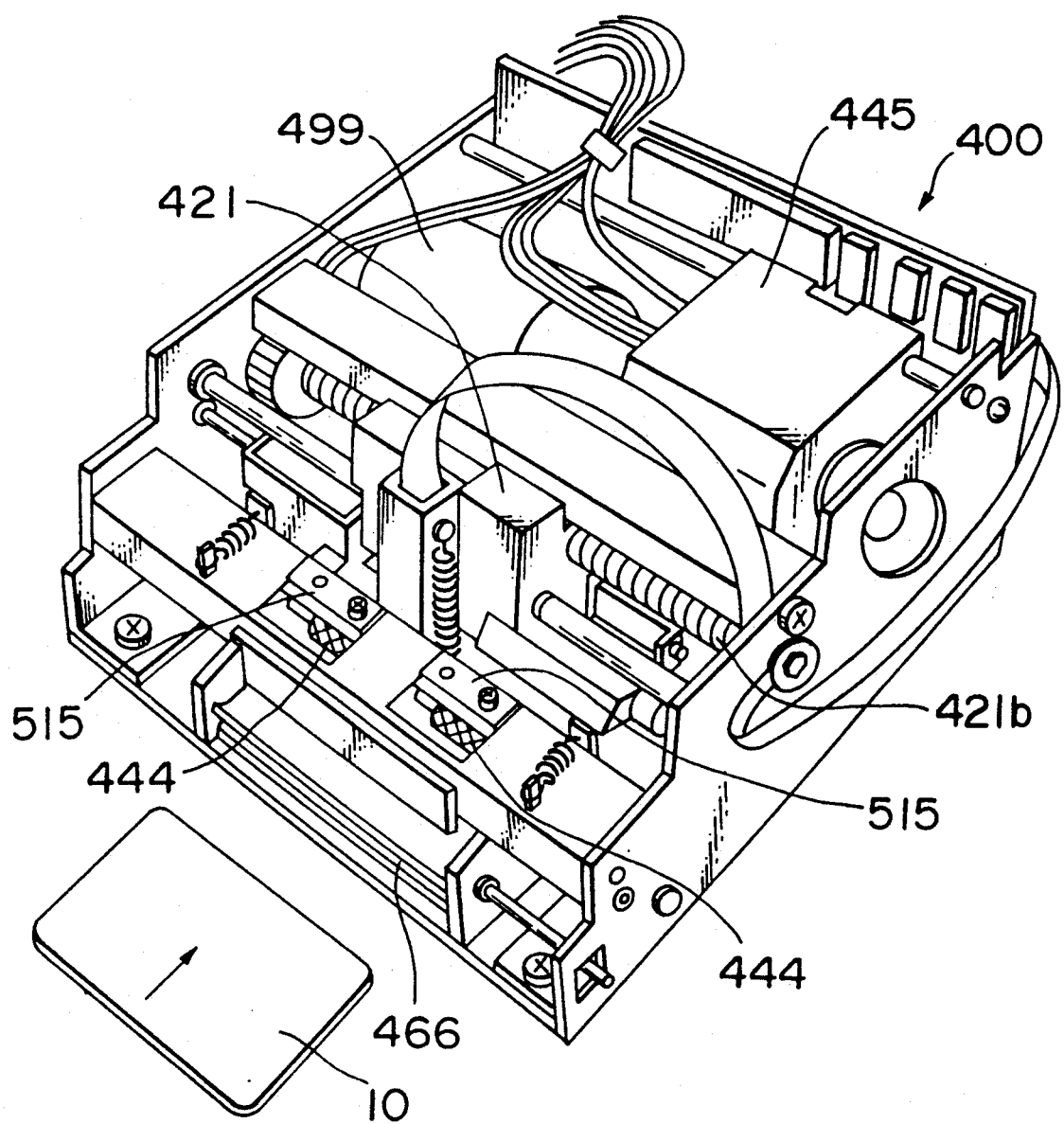
FIG. 6 is a perspective view of a combination of the magnetic card illustrated in FIGS. 1 and 2 and a specific example of the printing apparatus therefor illustrated in FIG. 4, according to still another embodiment of the invention.
Figure 7:
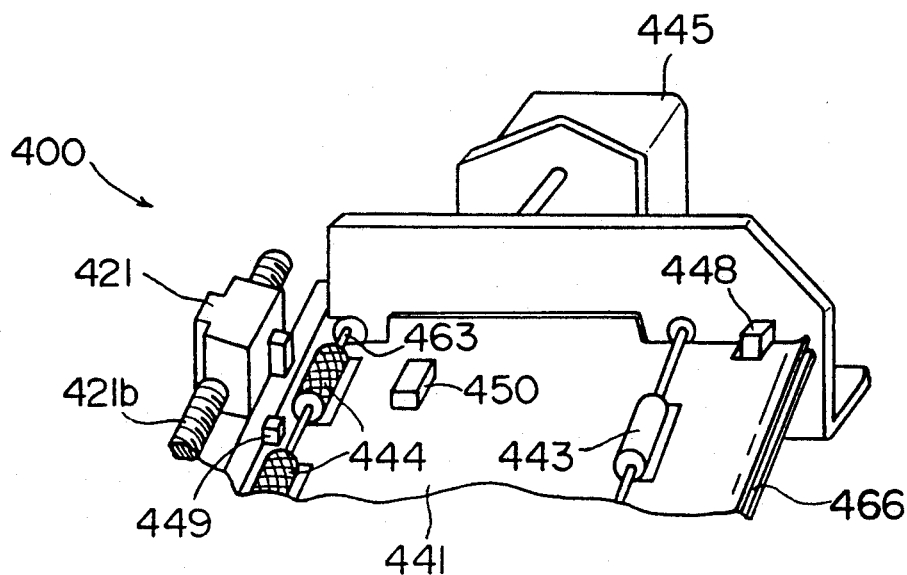
FIG. 7 is a fragmentary perspective view showing the printing apparatus illustrated in FIG. 6.
Figure 8:
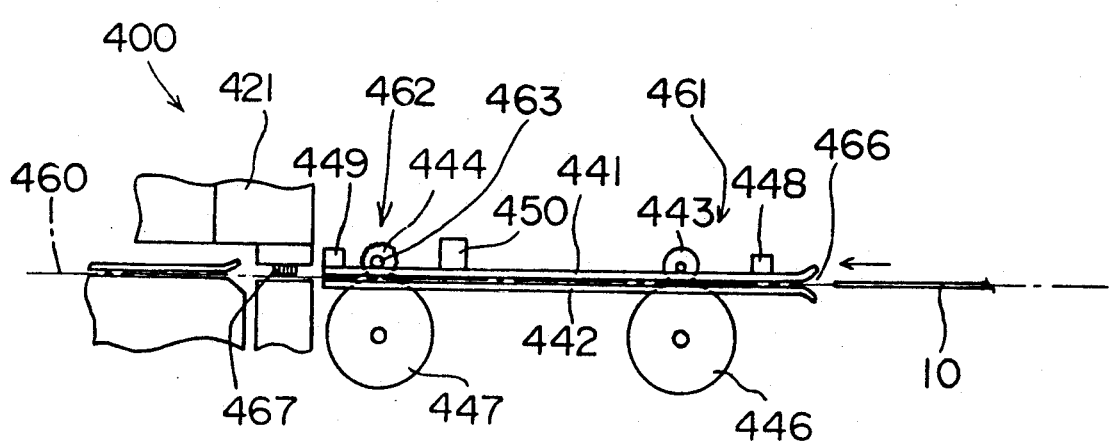
FIG. 8 is a fragmentary side elevational view of the combination illustrated in FIG. 6.

FIGS. 6, 7 and 8 show a specific example 400 of the printing apparatus of serial printer type, illustrated in FIG. 4.

The printing apparatus 400 comprises a pair of upper and lower guide plates 441 and 442 which define therebetween a transporting path 460 for the magnetic card 10. A pair of roller units 461 and 462 are arranged respectively at both end areas of the guide plates 441 and 442. One of the pair of roller units 461, on the upstream side, comprises an upper guide roller 443 made of an insulator such as a plastic material or the like, and a lower drive roller 446 which is made of an insulator such as rubber or the like and which is rotatively driven by a motor 445. The guide roller 443 and the drive roller 446 are in contact with each other through openings which are formed respectively in the pair of guide plates 441 and 442, and are arranged in opposed relation to each other.

The other roller unit 462, on the downstream side, comprises a pair of upper earth rollers 444 which are arranged on a rotary shaft 463 in spaced relation to each other therealong. The pair of upper earth rollers 444 are made of a metal and whose respective circumferential surfaces are knurling-finished. The other roller unit 462 further includes a lower drive roller 447 which is made of a material identical with that of the drive roller 446 and which is rotatively driven by the motor 445. The pair of earth rollers 444 and the drive roller 447 are in contact with each other through openings which are formed respectively in the pair of guide plates 441 and 442, and are arranged in opposed relation to each other.

A pair of sensors 448 and 449 are arranged respectively at a trailing edge and a leading edge of the card transporting path 460 defined between the guide plates 441 and 442, for detecting the magnetic guide plates 441 and 442, for detecting the magnetic card 10. Further, a magnetic head 450 is arranged at the leading area of the card transporting path 460, for reading magnetic information recorded on the magnetic recording layer 12 of the magnetic card 10 which is transported along the card transporting path 460. Furthermore, a feed screw 421b is arranged at a location adjacent to the leading edges of the guide plates 441 and 442, and is driven for rotation about an axis of the feed screw 421b by a motor 499 (refer to FIG. 6). A discharge head 421 is mounted on the feed screw 421b such that rotation of the feed screw 421b about an axis thereof moves reciprocatively the discharge head 421 in a direction perpendicular to the transporting path 460 along which the card 10 is transported.

With the printing apparatus 400 constructed as described above, the magnetic card 10 is first inserted into an inlet slot 466 which opens at the leading or front edges of the respective guide plates 441 and 442 in a direction indicated by the arrow. The sensor 448 detects the magnetic card 10 so that the motor 445 is driven. This rotates the drive rollers 446 and 447. The magnetic card 10 is transported to the left in FIG. 8 along the transporting path 460 defined between the guide plates 441 and 442.

The forward end of the magnetic card 10 is detected by the sensor 449. The magnetic head 450 reads information magnetic-recorded on the magnetic card 10. For example, in the case of the prepaid card, the magnetic head 450 reads information such as a used date, a used amount of money, the balance or remainder and the like. The motor 445 is pulse-controlled, and the magnetic card 10 is transported to a predetermined printing location. The magnetic card 10 once stops at the printing location. Under this condition, printing electrodes or pins 467 of the discharge head 421 are abutted against the printing surface 18 on the magnetic card 10.

The discharge head 421 is controlled on the basis of the information read in the above-described manner so that electric discharge voltage is applied to adequate ones of the printing pins 467.

On the other hand, the pair of earth rollers 444 are in contact with the upper surface of the magnetic card 10 having the printing area or surface 18, and the circumferential surface of each of the pair of earth rollers 444 is knurling-finished. Accordingly, the forward end of the knurling is cut into or bitten into the protective layer 16 within the printing surface 18 of the magnetic card 10, so that the forward end of the knurling is in contact with the conductive layer 15 through the protective layer 16 within the printing surface 18. Thus, the conductive layer 15 of the magnetic card 10 is brought substantially to earth electric potential. Accordingly, when the electric discharge voltage is applied to the printing pins 467 of the discharge head 421, an electric field and current density increase between the printing pins 467 and the conductive layer 15 of the magnetic card 10, because the forward ends of the respective printing pins 467 are small in cross-section. Thus, Joule heat is generated to burn a metal such as aluminum or the like, which forms the conductive layer 15 so that ion discharge is effected under a gas condition. Thus, parts of the conductive layer 15 disappear at the areas which are opposed to the printing pins 467 so that parts of the coloring layer 14 located below the disappearing parts of the conductive layer 145 are exposed to the outside.

In the embodiment illustrated in FIGS. 6 through 8 and various embodiments to be described later, the pair of earth rollers 444 and the single drive roller 447 are provided. It should be understood by one skilled in the art, however, that the pair of earth rollers 444 may be a single earth roller in which the pair of earth rollers 444 are contiguous to each other along the rotary shaft 463, and the single drive roller 447 may be a pair of drive rollers which are spaced from each other along a rotary shaft therefor and which are abutted respectively against the pair of earth rollers 444.

By the way, in the case where the substrate 11 of the magnetic card 10 is made of a relatively soft material such as a paper or the like, the forward end of the knurling of the pair of earth rollers 444 can sufficiently be cut into or bitten into the conductive layer 15. In the case, however, where the substrate 11 of the magnetic card 10 is made of a relatively hard material such as resin or the like, the forward end of the knurling of each of the pair of earth rollers 444 cannot sufficiently be bitten into the conductive layer 15 of the magnetic card 10. Accordingly, a contact area between the pair of earth rollers 444 and the conductive layer 15 of the magnetic card 10 decreases so that contact resistance increases. Thus, there is a fear or possibility that discharge breakdown occurs also between the pair of earth rollers 444 and the conductive layer 15. Further, in the case where the contact resistance is made larger than resistance between the conductive layer 15 and the discharge pins 467 of the printing head 421, there is a possibility that discharge breakdown occurs only between the pair of earth rollers 444 and the conductive layer 15, that is, earth return occurs.

Moreover, during use, an oxide film is formed on the circumferential surface of each of the pair of earth rollers 444, and an insulator is adhered to the circumferential surface of the earth roller 444. Thus, there is a possibility that contact resistance between the earth roller 444 and the conductive layer 15 increases.

Figure 9:
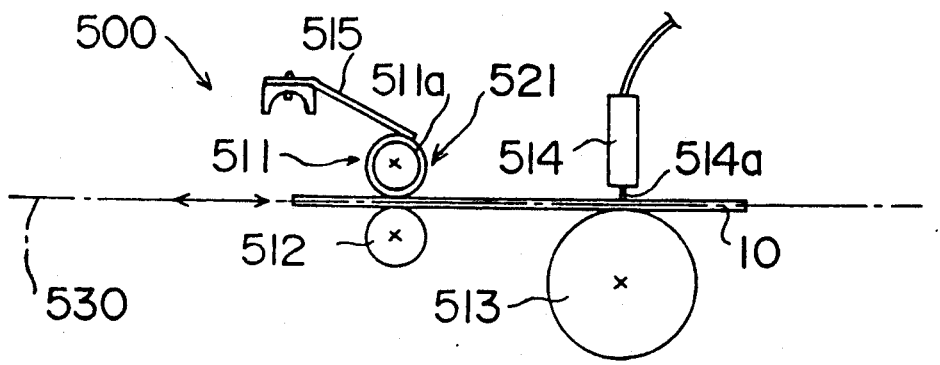
FIG. 9 is a fragmentary schematic side elevational view of a combination of a magnetic card and a printing apparatus therefor, according to another embodiment of the invention.
Figure 10:
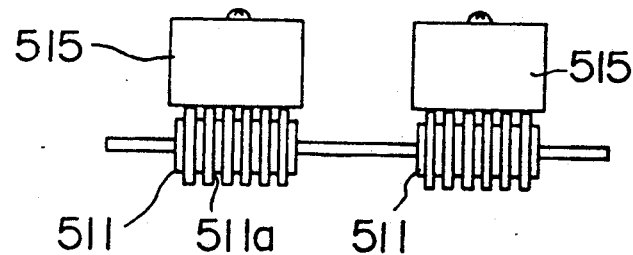
FIG. 10 is a fragmentary front elevational view showing a pair of earth rollers in the embodiment illustrated in FIG. 9.

Referring to FIGS. 9 and 10, there is shown a combination of a magnetic card and a printing apparatus 500 therefor, according to another embodiment of the invention. The magnetic card may be one illustrated in FIGS. 1 and 2. Thus, the combination of the magnetic card 10 illustrated in FIGS. 1 and 2 and the printing apparatus 500 will be described below.

The printing apparatus 500 comprises a roller assembly 521 which includes a pair of upper earth rollers 511 and a lower single pinch roller 512 which are arranged in opposed relation to each other so as to clamp therebetween the magnetic card 10. A printing head 514 arranged above a transporting path 530 for the magnetic card 10 has a forward end at which a plurality of discharge electrodes or pins 514a are so arranged as to be opposed to a platen 513 arranged below the transporting path 530. The discharge pins 514a are arranged in a direction perpendicular to the drawing sheet.

As shown in FIG. 10, each of the pair of earth rollers 511 has a circumferential surface which is formed with a plurality of annular projections 511a spaced from each other along an axial direction of the earth rollers 511. Each of the annular projections 511a may be rectangular in cross-section.

A pair of cleaning plates 515 (reference should be made to FIG. 6) is provided in association respectively with the pair of earth rollers 511. Each of the pair of cleaning plates 515 has a free end which is abutted against a corresponding one of the pair of earth rollers 511. The other end of the cleaning plate 515 is fixedly mounted to a body of the printing apparatus 500. Rotation of the pair of earth rollers 511 causes the circumferential surface of each of the earth rollers 511 to be scratched off by the cleaning plates 515. Thus, even in the case where foreign matters such as insulator and the like are adhered to the circumferential surface of each of the earth rollers 511, it is possible to remove the foreign matters by the cleaning plates 515. Accordingly, there is no case where adhering of the foreign matters to the circumferential surface of each of the earth rollers 511 increases the contact resistance between the earth rollers 511 and the conductive layer 15 of the magnetic card 10.

In operation, since each of the pair of earth rollers 511 has the circumferential surface which is formed with the annular projections 511a, the annular projections 511a are cut into or bitten into the conductive layer 15 of the magnetic card 10 within the printing surface 18 and are in contact with the conductive layer 15. Each earth roller 511 is in contact with the conductive layer 15 of the magnetic card 10 with a relatively wide or large contact area. Thus, it is secured that the conductive layer 15 of the magnetic card 10 is brought to earth potential. Accordingly, when the discharge voltage is applied to the discharge pins 514a of the printing head 514, since the forward ends of the respective discharge pins 514a are small in cross-section, an electric field and current density increase between the discharge pins 514a and the conductive layer 15 of the magnetic card 10. Joule heat is generated to burn a metal such as aluminum or the like, which forms the conductive layer 15 so that ion discharge is effected under a gas condition. Thus, parts of the conductive layer 15 disappear at the areas which are opposed to the printing pins 514a so that parts of the coloring layer 14 located below the disappearing parts of the conductive layer 15 are exposed to the outside.

Thus, according to the embodiment of the invention illustrated in FIGS. 9 and 10, reduction of the contact resistance between the pair of earth rollers 511 and the conducive layer 15 formed on the one side of the magnetic card 10 can ensure or secure that the discharge breakdown is effected between the conductive layer 15 and the discharge pins 514a of the printing head 514.

By the way, in the discharge-breakdown printing apparatus 500 constructed as described above, when the magnetic information is read from and written to the magnetic recording layer 12 of the magnetic card 10, it is required to transport the magnetic card 10 at a constant speed.

However, the arrangement is such that, when printing due to the discharge breakdown is effected, the magnetic card 10 is clamped between the pair of earth rollers 511 and the pinch roller 512 with a relatively strong urging force, thereby bringing the circumferential surface of each of the pair of earth rollers 511 into contact with the conductive layer 15 of the magnetic card 10. For this reason, when the magnetic card 10 reaches a position of the pair of earth rollers 511 in the course of reading and writing of the magnetic information on the magnetic card 10, the transporting speed of the magnetic card 10 abruptly changes or is retarded so that the magnetic card 10 is not transported at a constant speed. Thus, there is a possibility that reading and writing are not accurately effected.

Figure 11:
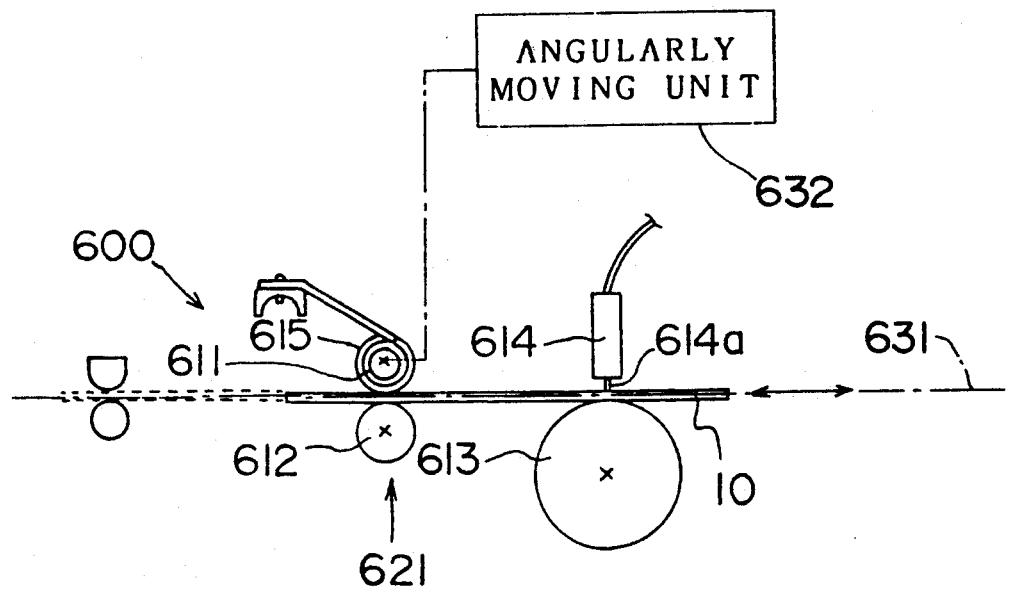
FIG. 11 is a fragmentary schematic side elevational view of a combination of a magnetic card and a printing apparatus therefor, according to another embodiment of the invention.
Figure 12:
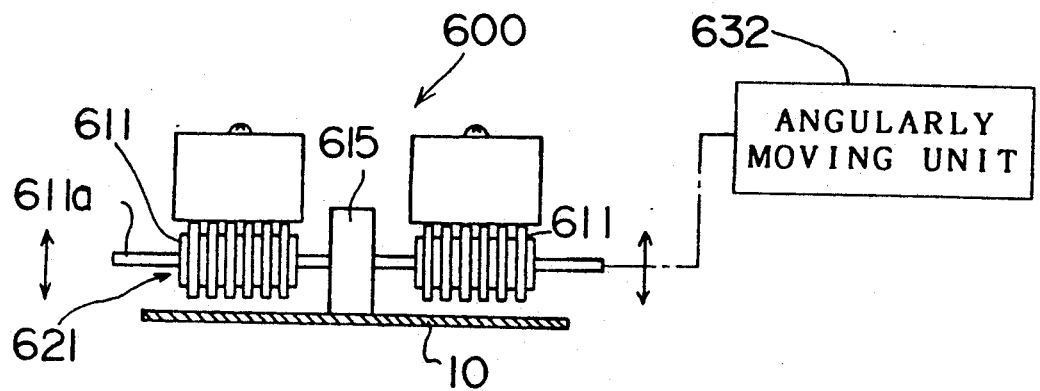
FIG. 12 is a fragmentary front elevational view showing a pair of earth rollers in the embodiment illustrated in FIG. 11.

Referring to FIGS. 11 and 12, there is shown a combination of a magnetic card and a printing apparatus 600, according to still another embodiment of the invention. The magnetic card may be one illustrated in FIGS. 1 and 2. Thus, the combination of the magnetic card 10 illustrated in FIGS. 1 and 2 and the printing apparatus 600 will be described below.

The printing apparatus 600 comprises a roller assembly 621 which includes a pair of upper earth rollers 611 and a lower single pinch roller 612 which are arranged in opposed relation to each other so as to clamp therebetween the magnetic card 10. A printing head 614 arranged above a transporting path 631 for the magnetic card 10 has a forward end at which a plurality of discharge electrodes or pins 614a are so arranged as to be opposed to a platen 613 arranged below the transporting path 631.

As shown in FIG. 12, the pair of earth rollers 611 mounted on a rotary shaft 611a are spaced from each other along the rotary shaft 611a. A transporting roller 615 made of a resilient or elastic material and larger in diameter than the pair of earth rollers 611 is mounted on the rotary shaft 611a at a location between the pair of earth rollers 611. An angularly moving unit 632 is connected to the rotary shaft 611a so that the rotary shaft 611a is movable toward and away from the surface of the magnetic card 10.

In operation, in the case where the magnetic card 10 is transported along the transporting path 631, the rotary shaft 611a for the pair of earth rollers 611 is moved to a location slightly spaced upwardly from the transporting path 631 for the magnetic card 10. Under this condition, only the transporting roller 615 is urged against the surface of the magnetic card 10.

Accordingly, when, for example, the magnetic card 10 is inserted into a location between the transporting roller 615 and the pinch roller 612 from the left in FIG. 11, rotational driving of the pinch roller 612 causes the magnetic card 10 to be transported to the right in FIG. 11, so that the magnetic card 10 is transported at a constant speed. It can be ensured that the magnetic information is read from and written to the magnetic card 10 by a magnetic head of a read/write unit (not shown).

Subsequently, when the printing area or surface 18 (see FIG. 1) on the upper surface of the magnetic card 10 is brought to a location opposed to the discharge pins 614a which are arranged at the forward end of the printing head 614, the rotary shaft 611a for the pair of earth rollers 611 is moved downwardly by the angularly moving unit 632 and approaches the printing surface 18 on the magnetic card 10. Thus, the circumferential surfaces of the respective earth rollers 611 are urged against the printing surface 18 on the magnetic card 10 with the urging force.

Accordingly, the circumferential surfaces of the respective earth rollers 611 are in contact with the conductive layer 15 of the magnetic card 10 so that the conductive layer 15 of the magnetic card 10 is retained at the earth potential.

At this time, since the transporting roller 615 is made of the elastic material, the transporting roller 615 can be deformed or compressed on the basis of the elasticity of the transporting roller 615. Thus, discharge voltage is applied, from the outside, to predetermined ones of the discharge pins 614a of the printing head 614. On the other hand, the pair of earth rollers 611 are urged against the printing surface 18 on the magnetic card 10 so that the conductive layer 15 within the printing surface 18 is brought to the earth potential. Accordingly, a high potential difference occurs between the discharge pins 614a and the printing surface 18 on the magnetic card 10, so that discharge occurs between the discharge pins 614a and the conductive layer 15 of the magnetic card 10. By this discharge, areas of the conductive layer 15 on the magnetic card 10, which are opposed to the discharge pins 614a are broken. Bores due to the discharge breakdown are formed through the areas. Parts of the coloring layer 14, which are located below the areas, are exposed to the outside. Accordingly, in the case where observation is made from the above, colored display is effected whose configuration corresponds to the bore/bores.

Thus, according to the embodiment of the invention illustrated in FIGS. 11 and 12, even if the magnetic card 10 is in contact with the circumferential surfaces of the respective earth rollers 611, in the course of reading and writing of the magnetic information with respect to the magnetic card 10, the transporting speed of the magnetic card 10 does not change.

By the way, in the combination of the magnetic card 10 and the printing apparatus 600, illustrated in FIGS. 11 and 12, in order to reduce a value of the contact resistance between the magnetic card 10 and the pair of earth rollers 611 to prevent earth return thereby improving the printing quality, if the urging force of the earth rollers 611 with respect to the magnetic card 10 increases, the opposed pinch roller 612 is deformed due particularly to the urging at repose or rest so that unevenness or irregularity occurs in the transporting speed of the magnetic card 10. As a result, there is a possibility that accuracy of a new line of the magnetic card 10 is reduced or deteriorated, and reading and writing of data become inferior.

The above-described possibility is a possibility peculiar to the printing apparatus 600 in which the magnetic card 10 is always clamped between the earth rollers 611 and the opposed pinch roller 612. Accordingly, if the earth rollers 611 are urged against the magnetic card 10 only at printing by the angularly moving unit 632 including a cam mechanism, the aforesaid possibility will be nullified. Since, however, this necessitates the angularly moving unit 632 including the cam mechanism, the manufacturing cost will rise, and cannot be used in a combination of low-cost type.

Figure 13:
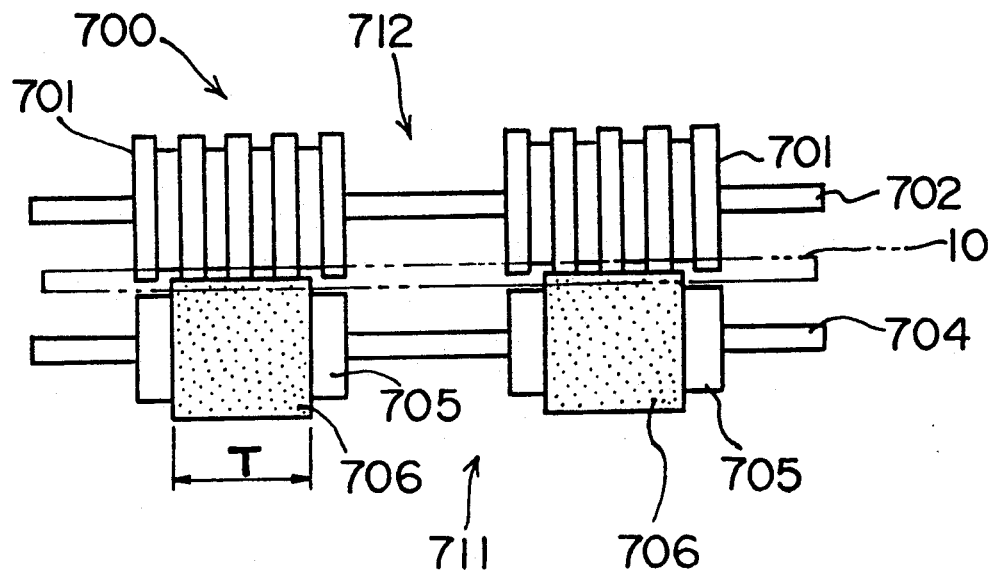
FIG. 13 is a fragmentary schematic front elevational view of a combination of a magnetic card and a printing apparatus therefor, according to still another embodiment of the invention.
Figure 14:
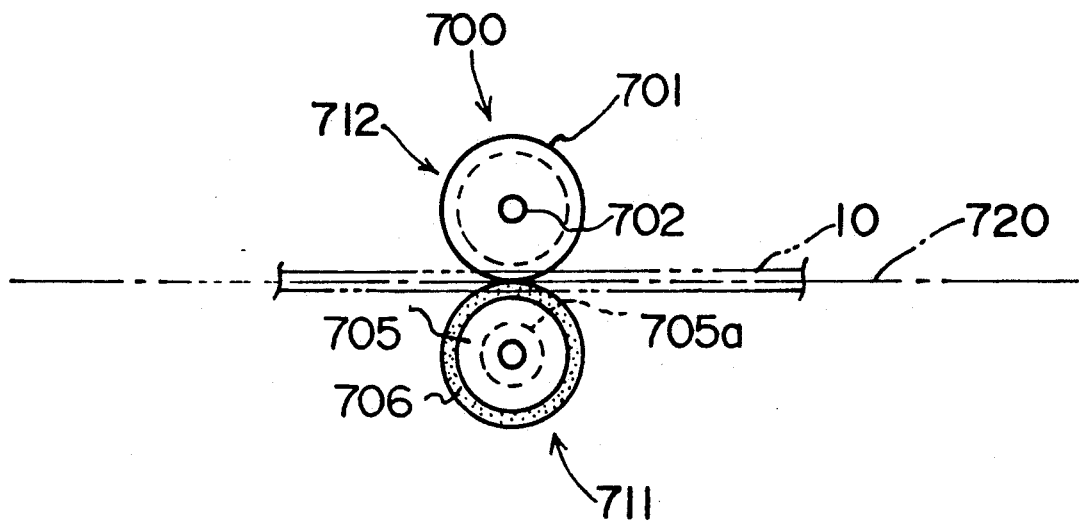
FIG. 14 is a fragmentary side elevational view of the combination illustrated in FIG. 13.

Referring to FIGS. 13 and 14, there is shown a combination of a magnetic card and a printing apparatus 700, according to still another embodiment of the invention. The magnetic card may be one illustrated in FIGS. 1 and 2. Thus, the combination of the magnetic card 10 illustrated in FIGS. 1 and 2 and the printing apparatus 700 will be described below.

A roller unit includes an opposed roller assembly 711 mounted on a rotary shaft 704 in opposed relation to an earth roller assembly 712. A transporting path 720 for the magnetic card 10 extends between the opposed roller assembly 711 and the earth roller assembly 712 mounted on a rotary shaft 702. The opposed roller assembly 711 includes a pair of metal hard rollers 705 spaced apart from each other along the rotary shaft 704. Each of the pair of hard rollers 705 has an outer circumferential surface formed therein with an annular groove 705a and a rubber ring 706 fitted in the annular groove 705a. The earth roller assembly 712 includes a pair of spaced earth rollers 701 which are adapted to be urged respectively against the rubber rings 706 fitted respectively in the annular grooves 705a in the hard rollers 705.

In connection with the above, it is sufficient only that the rubber ring 706 is fitted merely in the annular groove 705a in each of the hard rollers 705 as described above. In the case, however, where the urging force of the earth rollers 701 is strong or large, it is desirable that the rubber ring 706 is bonded or adhered to or is seized to the annular groove 705a in each of the hard rollers 705. Further, the depth of the annular groove 705a and the thickness and hardness of the rubber ring 706 are decided in consideration of the urging force of each of the earth rollers 701, compressive permanent strain or deformation of the rubber ring 706, and the like. Furthermore, a width T of the rubber ring 706 is decided in consideration of the contact area between the magnetic card 10 and the rubber ring 706.

The combination illustrated in FIGS. 13 and 14, according to the embodiment of the invention has been constructed as described above. In the case where an urging force equal to or larger than a constant or predetermined force is applied to the pair of opposed hard rollers 705 respectively from the pair of earth rollers 701, the surfaces of the earth rollers 701 are abutted respectively against the circumferential surfaces of the hard rollers 705 so that the hard rollers 705 are prevented from being moved radially more than that. Accordingly, the rubber rings 706 in the opposed rollers 705 are not deformed more than the necessity. Thus, unevenness or irregularity does not occur in the transporting speed of the magnetic card 10. Accordingly, there is no possibility that accuracy of a new line of the magnetic card 10 is reduced or deteriorated, and reading and writing of data become inferior. Moreover, the manufacturing cost is low.

Figure 15:
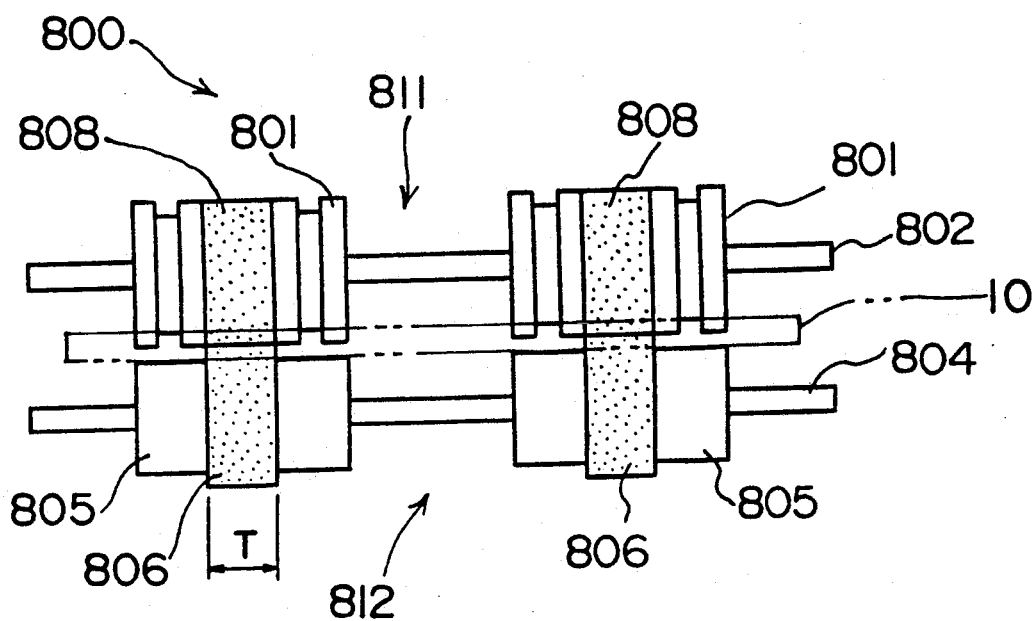
FIG. 15 is a view similar to FIG. 13, but showing a combination according to another embodiment of the invention.
Figure 16:
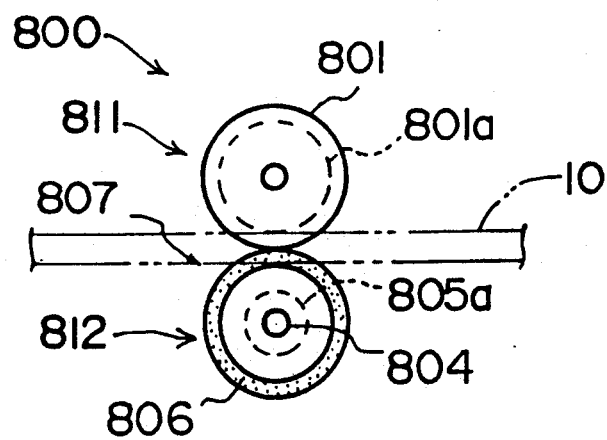
FIG. 16 is a fragmentary side elevational view of the combination illustrate in FIG. 15.

Referring to FIGS. 15 and 16, there is shown a combination of the magnetic card 10 and a printing apparatus 800 therefor, according to another embodiment of the invention. The combination comprises an earth roller assembly 811 which includes a pair of earth rollers 801 mounted on a rotary shaft 802 in spaced relation to each other along an axis of the rotary shaft 802. An opposed roller assembly 812 includes a pair of opposed rollers 805 adapted to be urged respectively against the pair of earth rollers 801. The pair of opposed rollers 805 are mounted on a rotary shaft 804 in spaced relation to each other along an axis of the rotary shaft 804.

The earth roller assembly 811 includes a pair of rubber rings 808 adapted to be urged respectively against a pair of rubber rings 806 fitted respectively in annular grooves 805a in hard rollers 805. The pair of rubber rings 808 are fitted respectively in annular grooves 801a in the pair of earth rollers 801. Thus, resiliency of elasticity of the rubber rings 808 enables deformation of the rubber rings 806 in the opposed rollers 805 to be further restrained.

In the embodiments illustrated in FIGS. 13 through 16, the material of each of the hard rollers 705 or 805 is not limited to a metal. If the material of the hard roller 705 or 805 is a material higher in hardness than the rubber, the material of the hard roller 705 or 805 may be a plastic material, for example.

As described above, according to the embodiments illustrated in FIGS. 13 through 16, even if the urging force of the pair of earth rollers 701 or 801 increases, the pair of opposed rollers 705 or 805 are not deformed, and unevenness or irregularity does not occur in the transporting speed of the magnetic card 10. Accordingly, there is no possibility that accuracy of a new line of the magnetic card 10 is reduced or deteriorated, and reading and writing of data becomes inferior.

What is claimed is:

1. In a combination of a magnetic card and a printing apparatus therefor, said magnetic card comprising a substrate made of a non-magnetic material, a printing surface on at least a part of one side of said substrate, said printing surface having a coloring layer, a conductive layer and a protective layer, said coloring layer being located on the one side of said substrate, and said conductive layer being located between said coloring layer and said protective layer, said magnetic card further including a magnetic recording layer formed on one of the one and other sides of said substrate, magnetic information being magnetic-recorded on said magnetic recording layer; and said printer comprising electrosensitive means for discharge-breaking down said protective layer and said conductive layer of said printing surface, into a character pattern corresponding to said magnetic information magnetic-recorded on said magnetic recording layer, to expose at least a part of said coloring layer in at least an area of said protective layer and said conductive layer which is discharge-broken down, thereby indicating said character pattern.

2. In a combination of a magnetic card and a printing apparatus therefor, according to claim 1, wherein said substrate is made of one of a plastic material and a paper.

3. In a combination of a magnetic card and a printing apparatus therefor, according to claim 1, wherein said magnetic card further includes a magnetic recording layer and a second protective layer formed on the other side of said substrate with said magnetic recording layer located between said second protective layer and the other side of said substrate.

4. In a combination of a magnetic card and a printing apparatus therefor, according to claim 1, wherein said magnetic card further includes a magnetic recording layer formed on the one side of said substrate with said magnetic recording layer located between said coloring layer and the one side of said substrate.

5. In a combination of a magnetic card and a printing apparatus therefor, according to claim 1, wherein said protective layer is formed such that an insulator is coated on said conductive layer.

6. In a combination of a magnetic card and a printing apparatus therefor, according to claim 5, wherein said insulator is vinyl.

7. In a combination of a magnetic card and a printing apparatus therefor, according to claim 1, wherein said electrosensitive means of said printing apparatus includes a discharge head for effecting said discharge breakdown.

8. In a combination of a magnetic card and a printing apparatus therefor, according to claim 7, wherein said discharge head includes a plurality of printing pins arranged along said transporting path.

9. In a combination of a magnetic card and a printing apparatus therefor, according to claim 7, wherein said discharge head includes a plurality of printing pins arranged in a direction perpendicular to said transporting path substantially over an entire width of said magnetic card.

10. In a combination of a magnetic card and a printing apparatus therefor, according to claim 1, wherein a transporting path is defined along which said magnetic card is transported, said electrosensitive means being arranged by said transporting path, and wherein said printing apparatus further includes roller means arranged at a trailing end of said transporting path, said roller means including an earth roller assembly, said magnetic card being transported along said transporting path while being in contact with said earth roller assembly.

11. In a combination of a magnetic card and a printing apparatus therefor, according to claim 10, wherein said earth roller assembly having a circumferential surface thereof which is knurled.

12. In a combination of a magnetic card and a printing apparatus therefor, according to claim 10, wherein said roller means further includes a drive roller assembly arranged in opposed relation to said earth roller assembly, said transporting path extending between said earth roller assembly and said drive roller assembly.

13. In a combination of a magnetic card and a printing apparatus therefor, according to claim 10, wherein said earth roller assembly includes at least one earth roller having a circumferential surface to be urged against said magnetic card, said circumferential surface of said earth roller being irregular in an axial direction of said earth roller assembly.

14. In a combination of a magnetic card and a printing apparatus therefor, according to claim 13, wherein said circumferential surface of said earth roller has a plurality of annular projections spaced from each other along said axial direction.

15. In a combination of a magnetic card and a printing apparatus therefor, according to claim 13, wherein said earth roller assembly includes a pair of earth rollers arranged in spaced relation to each other in the axial direction of said earth roller assembly.

16. In a combination of a magnetic card and a printing apparatus therefor, according to claim 10, wherein said printing apparatus comprises cleaning plate means abutted against a circumferential surface of said earth roller assembly.

17. In a combination of a magnetic card and a printing apparatus therefor, according to claim 16, wherein said earth roller assembly includes a pair of earth rollers arranged in spaced relation to each other in the axial direction of said earth roller assembly, said pair of earth rollers having respective circumferential surfaces thereof to be urged against said magnetic card, said circumferential surfaces of the respective earth rollers being irregular in an axial direction of said earth roller assembly, and wherein said cleaning plate means includes a pair of cleaning plates which are abutted respectively against the circumferential surfaces of said pair of respective earth rollers.

18. In a combination of a magnetic card and a printing apparatus therefor, according to claim 10, wherein said earth roller assembly has a circumferential surface thereof which is plated by one of platinum group elements.

19. In a combination of a magnetic card and a printing apparatus therefor, according to claim 18, wherein said platinum group elements include rhodium, ruthenium and palladium.

20. In a combination of a magnetic card and a printing apparatus therefor, according to claim 2, wherein said printing apparatus comprises a rotary shaft, said earth roller assembly including at least one earth roller which is mounted on said rotary shaft for rotation about an axis of said rotary shaft, wherein said printing apparatus further includes a transporting roller made of an elastic material, said transporting roller being mounted on said rotary shaft in spaced relation to said earth roller, and moving means for moving said rotary shaft toward and away from the one side of said magnetic card, and wherein, when said magnetic card is transported along said transporting path, a circumferential surface of said earth roller mounted on said rotary shaft is moved away from the one side of said magnetic card so that only said transporting roller is urged against the one side of said magnetic card to transport said magnetic card along said transporting path, while, when printing is made on said magnetic card, said rotary shaft is moved toward the one side of said magnetic card so that both said earth roller and said transporting roller are abutted against the one side of said magnetic card.

21. In a combination of a magnetic card and a printing apparatus therefor, according to claim 20, wherein said earth roller assembly includes a pair of earth rollers arranged in spaced relation to each other in the axial direction of said earth roller assembly, said transporting roller being arranged between said pair of earth rollers.

22. In a combination of a magnetic card and a printing apparatus therefor, according to claim 20, wherein said transporting roller is made of an elastic material and has a diameter larger than that of said earth roller.

23. In a combination of a magnetic card and a printing apparatus therefor, according to claim 10, wherein said roller means further includes an opposed roller assembly arranged in opposed relation to said earth roller assembly, said transporting path extending between said earth roller assembly and said opposed roller assembly, and wherein said opposed roller assembly includes at least one hard roller having an outer circumferential surface formed therein with an annular groove and a rubber ring fitted in said annular groove.

24. In a combination of a magnetic card and a printing apparatus therefore, according to claim 23, wherein said earth roller assembly includes a rubber ring adapted to be urged against said rubber ring fitted in said annular groove in said hard roller.

25. In a combination of a magnetic card and a printing apparatus therefor, according to claim 24, wherein said earth roller assembly includes a pair of earth rollers arranged in spaced relation to each other in the axial direction of said earth roller assembly, and wherein said opposed roller assembly includes a pair of opposed rollers adapted to be urged respectively against said pair of earth rollers.

* * * * *